(12) United States Patent
Iagounov et al.

(10) Patent No.: US 9,103,909 B2
(45) Date of Patent: Aug. 11, 2015

(54) SYSTEM AND METHOD FOR DETERMINING WHETHER AN OBJECT IS LOCATED WITHIN A REGION OF INTEREST

(75) Inventors: Oleg Iagounov, Maple (CA); Don Ferguson, Maple (CA)

(73) Assignee: Lyngose Systems Ltd., Mississauga, Ontario (CA)

( * ) Notice: Subject to any disclaimer, the term of this patent is extended or adjusted under 35 U.S.C. 154(b) by 785 days.

(21) Appl. No.: 13/341,159

(22) Filed: Dec. 30, 2011

(65) Prior Publication Data

US 2013/0169467 A1 Jul. 4, 2013

(51) Int. Cl.
*H04Q 5/22* (2006.01)
*G01S 13/04* (2006.01)
*G01S 13/75* (2006.01)
*B65F 3/02* (2006.01)

(52) U.S. Cl.
CPC ......... *G01S 13/04* (2013.01); *B65F 2003/0279* (2013.01); *G01S 13/75* (2013.01)

(58) Field of Classification Search
CPC .. G06K 7/0008; H04B 5/0056; H04B 5/0062; H04B 5/0068; B65F 2003/0279; G01S 13/04; G01S 13/75
USPC ............... 340/10.1, 568.1, 572.1–572.9, 540, 340/10.3, 10.34, 6.1, 8.1, 539.1, 539.13, 340/539.11
See application file for complete search history.

(56) References Cited

U.S. PATENT DOCUMENTS

| | | | | |
|---|---|---|---|---|
| 5,565,846 | A * | 10/1996 | Geiszler et al. | 340/572.2 |
| 6,486,769 | B1 * | 11/2002 | McLean | 340/10.32 |
| 7,199,719 | B2 * | 4/2007 | Steinberg | 340/572.8 |
| 8,330,059 | B2 * | 12/2012 | Curotto | 177/136 |
| 2004/0104817 | A1 * | 6/2004 | Wijk | 340/505 |
| 2005/0012613 | A1 | 1/2005 | Eckstein et al. | |
| 2005/0132796 | A1 | 6/2005 | Brookner | |
| 2008/0207357 | A1 * | 8/2008 | Savarese et al. | 473/407 |
| 2010/0179912 | A1 | 7/2010 | Curotto | |
| 2011/0030262 | A1 * | 2/2011 | O'Shaughnessy et al. | 42/70.01 |
| 2012/0319819 | A1 * | 12/2012 | Tkachenko | 340/10.1 |

FOREIGN PATENT DOCUMENTS

| | | | |
|---|---|---|---|
| EP | 1 612 579 | * | 1/2006 |
| EP | 1612579 | | 1/2006 |
| EP | 2224262 | | 9/2010 |

* cited by examiner

*Primary Examiner* — Daniel Previl

(57) ABSTRACT

A system for determining whether an object is within a region of interest includes a radiofrequency signal receiver outside of the region of interest configured to receive radiofrequency signals from the direction of the region of interest; and a radiofrequency transponder having a directional antenna outside of the region of interest and configured to transmit radiofrequency signals away from the radiofrequency signal receiver and towards the region of interest. Presence of an object within the region of interest causes radiofrequency signals transmitted by the radiofrequency transponder to reflect off of the object towards the radiofrequency signal receiver.

37 Claims, 5 Drawing Sheets

SYSTEM AND METHOD FOR DETERMINING WHETHER AN OBJECT IS LOCATED WITHIN A REGION OF INTEREST

FIELD OF THE INVENTION

The present invention relates generally to radiofrequency identification and location systems, and particularly to a system and a method for determining whether an object is located within a region of interest.

BACKGROUND OF THE INVENTION

Automatic Identification, or Auto-ID, is a term given to a broad category of technologies for the reliable and efficient identification, location, and tracking of objects. Two examples of Auto-ID technologies are bar coding and Radio Frequency Identification (RFID).

With bar coding a reading device uses optical laser or other imaging technology to scan and interpret a printed barcode on a label that is affixed to a respective object. However, with RFID, a reading device (or, reader) receives and interprets radio frequency electromagnetic signals transmitted wirelessly by a small electronic RFID tag that has been affixed to, or is otherwise associated with, a respective object. In a similar manner to bar coding, each RFID tag may transmit a unique radio frequency signal so as to uniquely identify the object with which it is associated. Alternatively, in a particular application, multiple RFID tags may transmit the same radio frequency signal if such uniqueness is not required.

An RFID tag is typically a radiofrequency transponder comprising a radiofrequency signal receiver and a radiofrequency signal transmitter in a single package, along with some processing circuitry to trigger transmission of the RFID tag's radiofrequency signal upon reception of an exciter signal (or, interrogation signal). Depending upon the needs of a particular application, an exciter signal may be transmitted from the same physical device as the reader, or by a separate device. An active RFID tag further includes a power source such as a battery for powering its own reception and transmission, whereas a passive RFID tag does not include its own such power source and is instead powered by electromagnetic energy in the exciter signals. Hybrid RFID tags exist that include a battery for supplementing the energy received in the exciter signal.

It is known for an RFID tag to be designed to derive the radiofrequency signal it transmits from the exciter signal it receives, whether using the same or a multiple of the carrier frequency of the exciter signal, or the same unique information carried in an exciter signal, for some examples. With an RFID tag using modulated backscatter, the exciter signal received at the RFID tag's antenna produces an electronic signal that can itself be modulated by the tag's processing circuitry with a unique signal stored on the tag, and routed back to the same antenna for transmission. In this sense the exciter signal received at the RFID tag is modified and "reflected" back to the exciter. With such an RFID tag, receiving and transmitting may be carried out by the same antenna and an entirely separate transmitter circuit is not required. It is also known for an RFID tag to be designed to transmit radiofrequency signals that are independent in that they are not so derived from a received exciter signal. As would be understood, the type of RFID tag chosen for a particular application depends on the needs of the application, the associated costs, and other factors.

The RFID reader/exciter may use a gated antenna array that includes a pair of vertically mounted antennae. The vertically mounted antennae are caused by suitable electronic circuitry to each produce and emit an electromagnetic exciter signal, as a respective interrogation field, at a particular frequency. The interrogation fields together form an interrogation zone in which the RFID device can be interrogated (i.e. excited) and detected. If an RFID tag is positioned within the interrogation zone for a sufficient time and is able to receive appropriate commands from the reader/exciter as well as adequate RF power to operate the device, it will become stimulated and transmit, either by generation of a radio frequency signal or by reflective means (i.e., using modulated backscatter), a uniquely coded signal that can be received by the same reader/exciter antennae that transmitted the exciter signal, or by a separate receiving antenna. The response signal from the RFID tag can be read by the reader, typically with a readable range on the order of a few feet, though broader or narrower ranges are possible.

A common application for RFID systems is in tracking objects for shipping such as shipping containers in a shipping terminal, or for waste management such as waste containers within a waste management facility. In such applications, the RFID tags are placed on the containers and are interrogated by RFID readers located at various locations within the terminal or facility, including vehicles, cranes, or other container moving equipment. In a waste management application, the event of a fork truck or front loader garbage truck picking up a waste container may need to be registered as an event for tracking the progress of waste management. In this process it may be useful to determine or validate the presence of the container on the end of the forks or other container lift mechanism and determine that the container was lifted to a particular height on its way to a dumping position. However, where registering this event requires the excitation and reception of radiofrequency signals from RFID tags affixed to the waste container, often there is a failure to register the event due to inadvertent shielding of radio signals resulting from radio frequency (RF) blocking materials (such as metal or liquids), interference between transmissions of multiple RFID tags in the vicinity, distance between RFID tags and readers, and other factors.

Another problem with an RFID tag placed on a container (a problem shared with bar coding) is that the container must always be aligned or picked up from the side of the container on which the RFID tag is mounted in order to be in the field of view of the barcode reader or RFID reader. As this is not always possible, nor practical, it is known to place each of multiple RFID tags at respective different locations on the container to improve the chances of reading by respective readers. It has been observed that this approach demands constant inspection, testing, and maintenance of the RFID tags to ensure that they remain operable and are positioned so as to be readable. This of course leads to increased operating costs and resources.

Some prior art systems determine the presence of a bin on the forks using proximity sensors and weight sensors mounted on the forks to detect the difference in load resistance during movement of the arms. Other systems determine a lift action using a sensor for detecting when the forks are in the up position as compared with a down position. However, such sensing equipment requires external wiring to connect the sensing equipment to other parts of the system, and the wiring itself is subject to mechanical failure, sensitive to rain, snow, heat in the environment and accordingly often requires regular servicing. In systems using proximity sensors, the proximity sensors themselves are generally exposed to the elements as they are generally mounted outside the vehicle. It has been observed that performance of such proximity sensors can be impaired when the sensors and/or wiring is/are covered with snow or ice. For example, false triggers are prevalent. In systems that detect presence of containers using the weight differential between unloaded forks and loaded forks, sensors or strain gages may be affixed directly on the forks. Alternatively, weight differential may be detected by detecting pressure differentials in hydraulic fluid in the hydraulic lifting equipment with and without a load on the lifting mechanism. However, these kinds of sensors are complex, typically require external mounting and wiring of sensitive components, typically require very tight integration with subcomponents of the vehicle itself, and typically require onerous maintenance and calibration.

SUMMARY OF THE INVENTION

According to an aspect, there is provided a system for determining whether an object is within a region of interest, the system comprising a radiofrequency signal receiver outside of the region of interest configured to receive radiofrequency signals from the direction of the region of interest; and a radiofrequency transponder having a directional antenna outside of the region of interest and configured to transmit radiofrequency signals away from the radiofrequency signal receiver and towards the region of interest, wherein presence of an object within the region of interest causes radiofrequency signals transmitted by the radiofrequency transponder to reflect off of the object towards the radiofrequency signal receiver.

Advantageously, sensors or cabling external to the vehicle are not required to register completion of a lift event, nor is there a requirement for one or more RFID tags to be affixed to the object itself. As such, the system is simpler to implement and less difficult to maintain in good operating condition, and therefore can be more reliable than prior art systems.

According to another aspect, there is provided a method for determining whether an object is within a region of interest, the method comprising providing a radiofrequency signal receiver outside of the region of interest capable of receiving radiofrequency signals from the direction of the region of interest; directionally transmitting one or more radiofrequency signal away from the radiofrequency signal receiver and towards the region of interest; and determining whether an object is within the region of interest based on reception at the radiofrequency signal receiver of the directionally transmitted one or more radiofrequency signal.

Advantageously, directionally transmitting one or more radiofrequency signal away from the radiofrequency signal receiver and towards the region of interest and determining whether an object is within the region of interest based on reception of the one or more radiofrequency signal provides the determination as to whether an object is within a region of interest without requiring one or more radiofrequency transponders on the object itself.

BRIEF DESCRIPTION OF THE DRAWINGS

Several exemplary embodiments of the present invention will now be described, by way of example only, with reference to the appended drawings in which.

DETAILED DESCRIPTION

Figure 1:
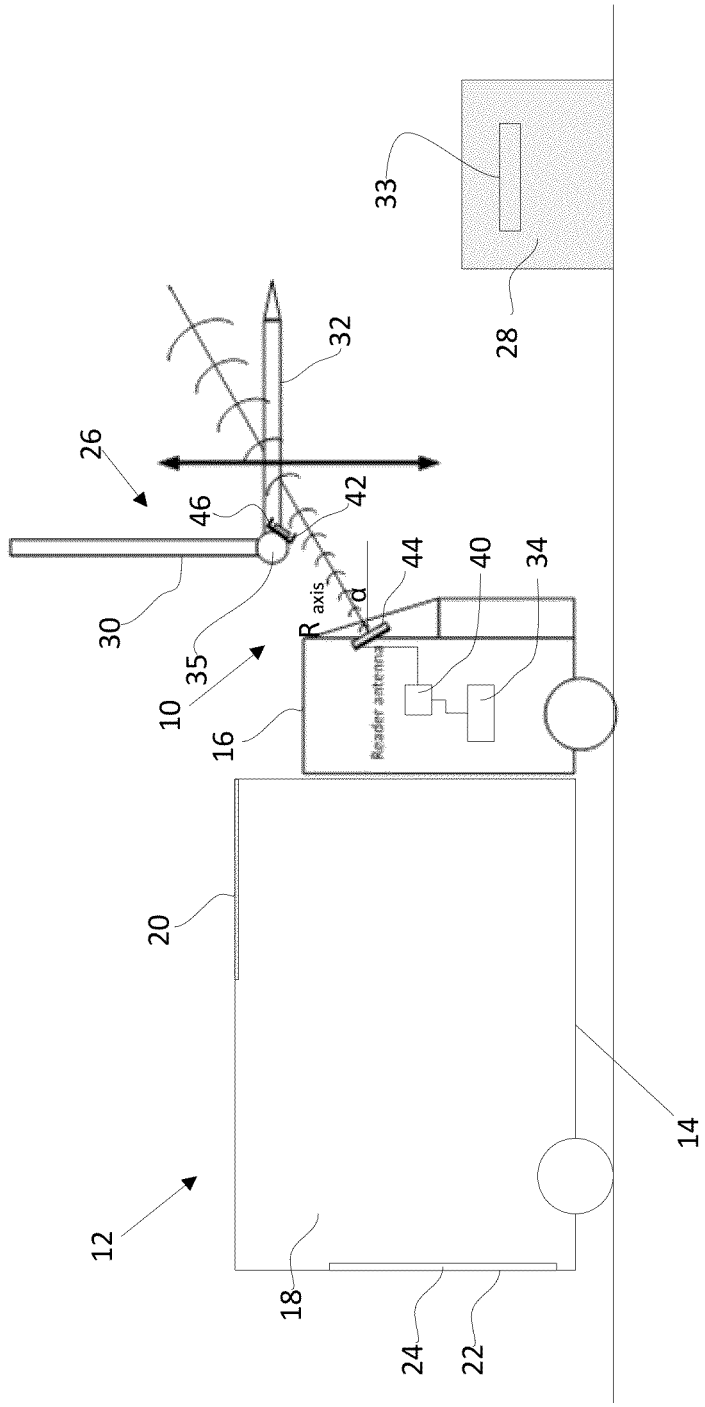
FIG. 1 is a schematic diagram including a system for determining whether an object is within a region of interest, with an object shown outside the region of interest, according to an embodiment.

Turning now to FIG. 1, a waste collection vehicle 12, for collecting and transporting waste materials, and a system 10 for determining whether an object, in this embodiment a waste container 28, is within a region of interest with respect to the waste collection vehicle 12, are shown. In this embodiment the waste collection vehicle 12 is a front loader, generally used to pick up and receive waste from a large waste container 28, shown in front of the vehicle 12, and to transport the received waste to a landfill or recycling site. The front loader waste collection vehicle 12 comprises a wheeled chassis or frame 14, and a driver's compartment or cab 16 located at the front of the chassis 14. A collection container 18 having a relatively large volume interior collection area is carried on the frame 14 behind the cab 16. The collection container 18 includes an inlet opening 20 located in the top front section, through which waste materials may be loaded into the collection container 18. Once waste materials are loaded into the collection container 18, the waste materials may then be transported to a disposal or recycling site. The collection container 18 also includes a rear opening 22 with a pivotally attached tailgate 24 through which the waste materials may be off-loaded at the landfill or recycling site.

The waste collection vehicle 12 includes a lifting apparatus 26 pivotally mounted on the frame 14 for lifting waste container 28 and dumping waste materials from waste container 28 into the inlet opening 20. A dumping sequence is controllable by an operator of the vehicle 12 with the use of a controller 34, and begins with the lifting apparatus 26 engaging the waste container 28 from a load position by driving the truck towards the waste container 28 to engage the waste container 28 with the lifting apparatus 26. The load position may be ground level or an elevated position above the ground level. With the waste container 28 having been engaged, the lifting apparatus 26 is caused to lift the waste container 28 upwards to a position over top of the cab 16, and is then caused to tip, thereby to "pour" the waste contained in the waste container 28 into collection container 18 via the inlet opening 20. The waste materials may subsequently be compacted by a hydraulically powered mechanism, such as a packer blade, and moved to the rear of the collection container 18.

Figure 2:
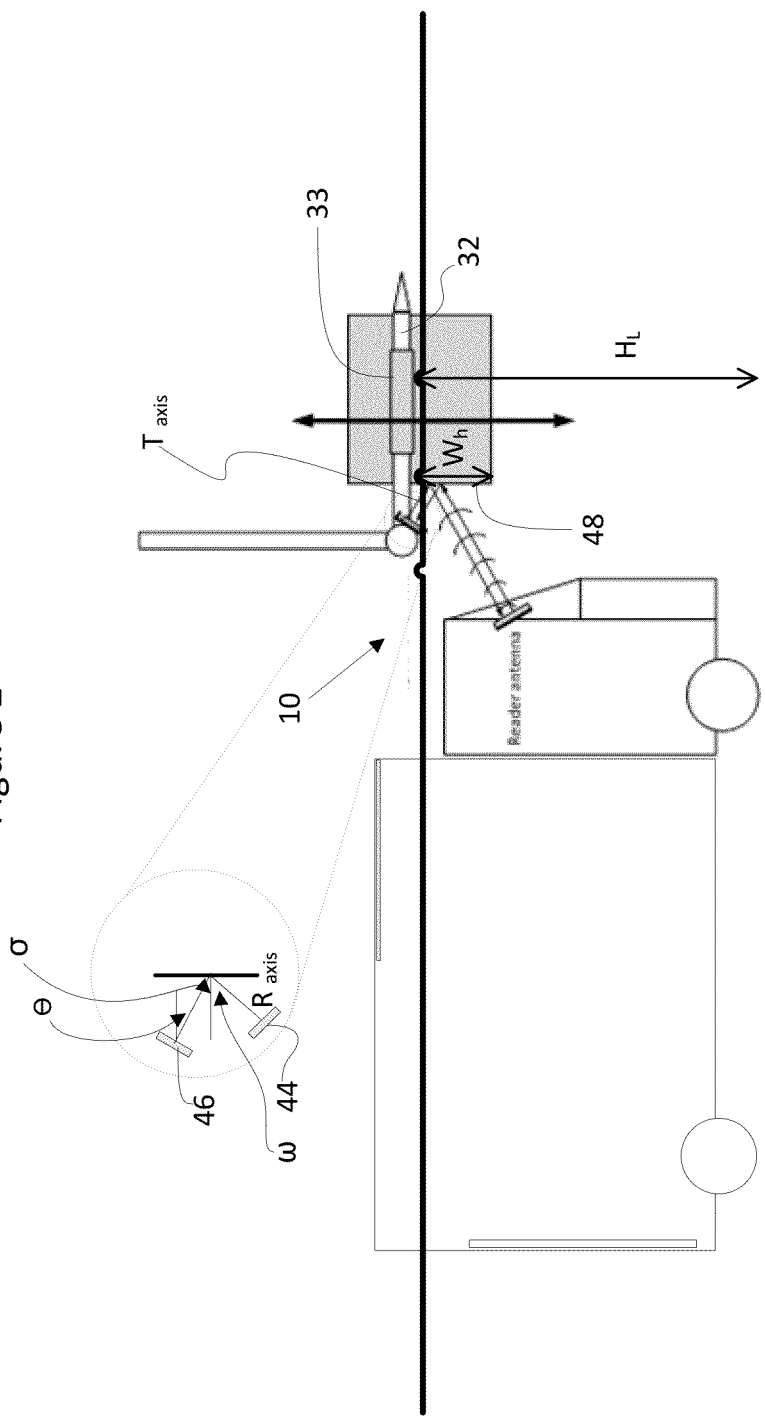
FIG. 2 is a schematic diagram including the system of FIG. 1 with the object within the region of interest.

The vehicle 12 shown in FIGS. 1 and 2 includes a lifting apparatus 26 having two long, hydraulically operated lift arms 30 that may be pivoted between a position behind and above the truck cab 16 and a position forward of the front bumper. The pivotable connection between the lift arms 30 and the vehicle 26 is not shown in the Figures. At the distal ends of arms 30 are forks 32, each of which is dimensioned to be received by a corresponding sleeve 33 on a respective side of the waste container 28. The forks 32 are joined to the arms 30 at respective pivot points 35 (only one pivot point 35 is shown in the Figures). In the loading position at the ground level, the forks 32 are substantially perpendicular to the arms 30, and remain this way while the waste container 28 is being elevated to a predetermined maximum height. Once the waste container 28 is elevated to its predetermined maximum height, the lift arms 30 are then pivoted backwards towards the collection container 18 of the vehicle 12. The forks 32 are accordingly tipped to further rotate the waste container 28 with respect to the vehicle 12 so as to dump waste material from the waste container 28 into inlet opening 20. Control of the lifting and rotation of the arms 30 and articulation of the forks 32 are performed by controller 34. The controller 34 receives various feedback data relating to the positioning of the arms 30 in relation to the frame 14 or collection container 18, the height of the forks 32 with respect to the vehicle 12, and outputs control signals to an actuation mechanism for articulating the forks 32 about the pivot points 35.

As will be described below, system 10 determines whether an object such as the waste container 28 has been engaged by the forks 32 and has also been lifted into a region of interest, thereby to provide to the controller 34 an indication that the waste container 28 has been picked up. In this embodiment, the region of interest is defined with respect to the vehicle, and in particular is the region in which a waste container 28 would be present if engaged by the lifting apparatus 26 and lifted to at least a predetermined height (before pivoting) with respect to the vehicle 12 by the lifting apparatus 26. For example, in FIGS. 1 and 2 the lifting apparatus 26 has been lifted to the same height, but in FIG. 2 the waste container 28 is present within the region of interest. The region of interest is preferably larger than the waste container 28. This permits a positive determination of the presence of the waste container 28 in the region of interest through a range of lift heights and not only at a particular lift height.

System 10 comprises a radiofrequency signal receiver outside of the region of interest and configured to receive radiofrequency signals from the direction of the region of interest. In this embodiment, the radiofrequency signal receiver is combined with an exciter in a single reader 40 having a reader antenna 44 that is oriented to face the region of interest. The reader 40 is mounted within the driver's compartment 16 of vehicle 12 and is thereby protected from outside elements, but is in clear "view" of the region of interest via the clear glass windshield of the vehicle 12. System 10 also comprises a radiofrequency transponder 42. The radiofrequency transponder 42 is also positioned outside of the region of interest and has a directional antenna configured to transmit radiofrequency signals away from the reader antenna 44 (and therefore away from the radiofrequency signal receiver) and towards the region of interest. In this embodiment, the radiofrequency transponder 42 is affixed between forks 32 to a cross member, or boom, at pivot point 35 of lifting apparatus 26 and is therefore moveable with respect to the region of interest. Also, the radiofrequency transponder 42 is mounted to the lifting apparatus 26 with an adjustable mount that permits adjustment of the position of the radiofrequency transponder with respect to the region of interest. The adjustable mount permits adjustable orientating of the radiofrequency transponder 42 when it is being installed so as to facilitate its correct installation.

The system 10 is configured such that radiofrequency signals are transmitted by the radiofrequency transponder 42 away from the reader antenna 44 so that the transmitted radiofrequency signals are not incident on the reader antenna 44 unless an object such as waste container 28 is present within the region of interest to cause radiofrequency signals transmitted by the radiofrequency transponder 42 to reflect off of a reflective surface of the waste container 28 and back towards the reader antenna 44. In this embodiment, the radiofrequency transponder transmits signals on Ultra High Frequency (UHF) carrier frequencies at 800 MHz or higher, since electromagnetic signals transmitted at 800 MHz or higher have reflection characteristics with respect to metal (such as the metal surface of a metal waste container 28) that are similar to light. That is, the angle of incidence of such signals on a metallic surface is about the same as the angle of reflection. This predictable reflection simplifies the placement and orientation of the components of system 10 with respect to the region of interest.

Due to the configuration of system 10, reception of the radiofrequency signals at the radiofrequency signal receiver of reader 40 provides an indication that the object may be present within the region of interest, whereas if no such signals have been received at the radiofrequency signal receiver of reader 44, the object is not present within the region of interest. This is achieved without a radiofrequency transponder to be affixed to the object itself.

In this embodiment, controller 34 further includes a meter for measuring signal strength of radiofrequency signals received by the radiofrequency signal receiver of the reader 40, and processing structure for determining whether the measured signal strength meets or exceeds a threshold level. In the event that the measured signal strength meets or exceeds the threshold level, the processing structure indicates that an object is present within the region of interest. In this embodiment, the processing structure provides its indication by triggering the creation and storage of a log entry in the controller 34. The log entry may be transmitted from controller 34 in a known manner to a central computer for system management and performance assessment. Alternatively, the processing structure may provide its indication by triggering creation of an electronic signal for use by controller 34 or an external system.

The comparison of the measured signal strength to the threshold level permits the system 10 to operate reliably despite the possibility that radiofrequency signals transmitted by the radiofrequency transponder 46 could find their way to the reader 40 despite the object not being present within the region of interest, due perhaps to reflection of the transmitted radiofrequency signals from surrounding structure such as the side of a building. Whereas determining whether the radiofrequency signal has been received regardless of received signal strength could cause a false determination of object presence in such an instance, it is far less likely that such an unintended reflection would result in a received signal strength meeting or exceeding the threshold level. As such, the careful setting of a threshold signal strength level can improve the reliability of the system 10.

In this embodiment, the controller 34 is an electronic microcontroller embodying the processing structure. Also in this embodiment, the radiofrequency transponder 42 is a passive RFID tag that transmits by "reflecting" a received exciter signal. The RFID tag comprises a computer readable memory unit, a central processing unit (CPU) and logic for executing functions, coupled to a directional antenna 46. An alternative type of RFID tag, such as an active tag, may be employed in a different implementation.

The radiofrequency exciter of reader 40 is itself configured to transmit exciter signals for exciting the radiofrequency transponder 42. In this embodiment, the radiofrequency exciter of reader 40 uses directional antenna 44 to transmit the exciter signals away from the radiofrequency transponder 42 and towards the region of interest.

During installation and configuration of system 10, it is preferred that each of the radiofrequency transponder 42, the radiofrequency signal receiver and the radiofrequency exciter of reader 40 is oriented with respect to the region of interest in such a manner as to provide the best possible combination of performance and reliability. The best possible combination of performance and reliability seeks to maximize signal strength of exciter signals received by the radiofrequency transponder 42 when an object is present in the region of interest, to maximize signal strength of radiofrequency signals received by the radiofrequency signal receiver when an object is present in the region of interest, to minimize signal strength of any exciter signals received by the radiofrequency transponder 42 when an object is not present in the region of interest, and to minimize signal strength of any radiofrequency signals received by the radiofrequency signal receiver when an object is not present in the region of interest.

While the lifting apparatus 26 may naturally provide shielding such that electromagnetic exciter signals are impeded from reaching radiofrequency transponder 42 directly, in embodiments, additional electromagnetic shielding may be provided for the radiofrequency signal receiver or the reader 40 as a whole, in such a manner as to impede or otherwise block reception of radiofrequency signals from directions other than the region of interest. Provision of the shielding reduces the likelihood that radiofrequency signals transmitted by the radiofrequency transponder 42 that bounce off surrounding objects such as building walls are received by the radiofrequency signal receiver 42. Similarly, in embodiments electromagnetic shielding may be provided for the radiofrequency transponder 42, in such a manner as to impede or otherwise block exciter signals being received from directions other than the region of interest. Provision of such shielding reduces the likelihood that exciter signals that may bounce off of surrounding objects such as building walls are received by the radiofrequency transponder 42.

In embodiments, a reflector is provided adjacent to the radiofrequency transponder 42 for directing exciter signals from the direction of the region of interest towards the radiofrequency transponder 42.

In FIG. 1, the lifting apparatus 26 is shown an unloaded state in which the waste container 28 rests on the ground level or initial rest location. The reader antenna 44 is mounted in the cab 16 facing outwardly and away from the horizontal ground plane towards the region of interest, while the transponder antenna 46 is also oriented to face the horizontal ground plane or in a position such that the boom provides adequate shielding or a shadow from direct impingement on the transponder antenna 46 of exciter signals. In the case where this is not possible introduction of additional reflective material may be necessary to provide adequate shielding or shadow for when no metal objects are engaged by the forks 32. The configuration upon installation is such that activation of the radiofrequency transponder 42 is only possible when the exciter signal has been reflected off of waste container 28 at the desired position back to the reader, signalling that a metal or otherwise reflective object is engaged by the forks 32 and raised into the region of interest.

The reader 40 emits periodical radiofrequency (RF) exciter/interrogation signals via the reader antenna 44 directionally along a transmission path with a transmission axis ($R_{axis}$) at an angle α from the ground plane. When the transponder antenna 46 emits response radiofrequency signals, the transmission path is along a transmission axis ($T_{axis}$) at an angle from the ground plane, as shown in FIG. 2. The angles α and are chosen such that the reader antenna 44 and the transponder antenna 46 do not face each other and therefore are not in each other's field of view. Therefore, in the unloaded state the periodical RF interrogation signals from the reader antenna 44 are not received by transponder antenna 46, and/or the received signal strength at the transponder antenna 46 is relatively low, and the corresponding response signal is received by the reader antenna 44 also has a relatively low signal strength.

In FIG. 2, the forks 32 have engaged the sleeves 33 on the sides of the waste container 28 thus rendering the lifting apparatus 26 to be in a loaded state, and the arms 30 then are raised away from the ground level as controlled by the controller 34, as part of the dumping sequence. As the arms 30 are elevated, the waste container 28 reaches a particular height above the ground level when the RF exciter signals from the reader antenna 44 along the transmission axis ($R_{axis}$) impinge a side wall 48 of the waste collection container 28 at an angle of incidence ω. At this height, the waste container 28 is within the region of interest. The RF exciter signals are subsequently reflected off of side wall 48 at an angle of reflection σ, which is equal to the angle of incidence ω. Therefore, the RF exciter signals reflected off of the side wall 48 are directed towards the transponder antenna 46 along transmission axis ($T_{axis}$) and are received by the transponder antenna 46 to excite and energize the radiofrequency transponder 42. In turn, the radiofrequency transponder 42 emits a radiofrequency response signal (again, at 800 Mhz or higher) along transmission axis ($T_{axis}$) towards the side wall 48 of the waste container 28 with an angle of incidence ω' (equal to the angle of reflection σ) and the radiofrequency response signal is reflected at an angle of reflection σ' (equal to the angle of angle of incidence ω), towards the reader antenna 42. The strong signal strength of the radiofrequency response signal at the reader antenna 42 is then correlated to the presence of the waste container 28 on the lift apparatus 26 and within the region of interest, and registered as a lift event by the controller 34, at height $H_L$ above the ground level or initial rest location. Based on the dimensions of the waste container 28 and the various orientation angles pertaining to antennae 42, 46, the radiofrequency transponder 42 continues to be read by reader 40 as long as portion $W_h$ of reflective surface of the side wall 48 remains in the field of view of the respective antennae 42 and 46. That is, the radiofrequency transponder 42 continues to be read by reader 40 as long as the waste container 28 is within the region of interest. Generally, the received signal strength will also vary as the portion $W_h$ enters and leaves the field of view of the respective antennae 42 and 46, with further indicating lifting of the waste container 28, thus resulting in a range of values corresponding the registration of the presence of the waste container 28.

Where the waste container 28 is not formed of a material suitable for reflecting radiofrequency signals as described above, the waste container 28 may further have secured to its side wall 48 a piece of metal foil for reflecting the signals.

While the system 10 has been described for use with a front loader waste collection vehicle 12, system 10 can be easily adapted for similar use with any of a rear loader, a side loader, a recycling truck or a grapple truck, or a fork truck, for use in various applications including waste collection, inventory management, and shipping.

Figure 3:
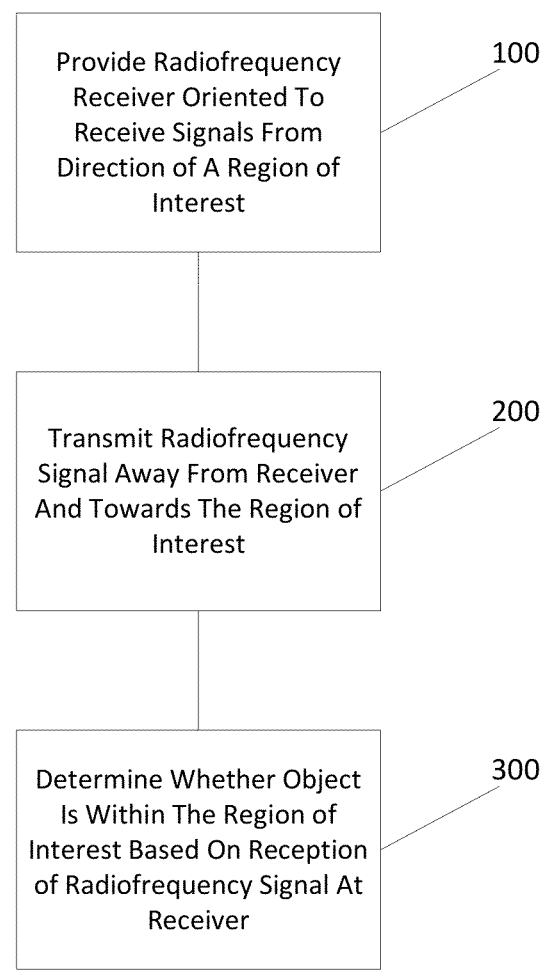
FIG. 3 is a flow diagram of a method for determining whether an object is within a region of interest.

FIG. 3 is a flow diagram of a method for determining whether an object is within a region of interest. Initially, a radiofrequency signal receiver is provided outside of the region of interest that is capable of receiving radiofrequency signals from the direction of the region of interest (step 100). One or more radiofrequency signal is/are directionally transmitted away from the radiofrequency signal receiver and towards the region of interest (step 200). An object is then determined to be within the region of interest based on reception at the radiofrequency signal receiver of the directionally transmitted one or more radiofrequency signal (step 300).

Figure 4:
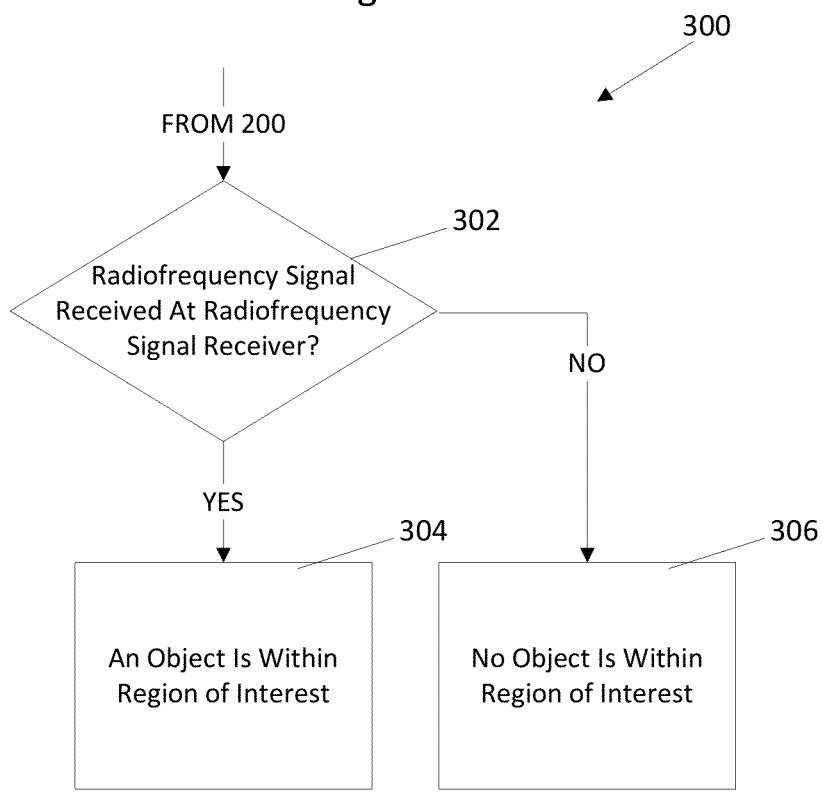
FIG. 4 is a flow diagram showing steps in one embodiment of the determining step of FIG. 3.

FIG. 4 is a flow diagram showing steps in one embodiment of the determining step of FIG. 3. At step 302, it is determined whether a radiofrequency signal has been received at the radiofrequency signal receiver. In the event that it is determined at step 302 that a radiofrequency signal has been received, an object is considered to be within the region of interest (step 304). On the other hand, in the event that it is determined at step 302 that a radiofrequency signal has not been received, no object is considered to be within the region of interest (step 306).

Figure 5:
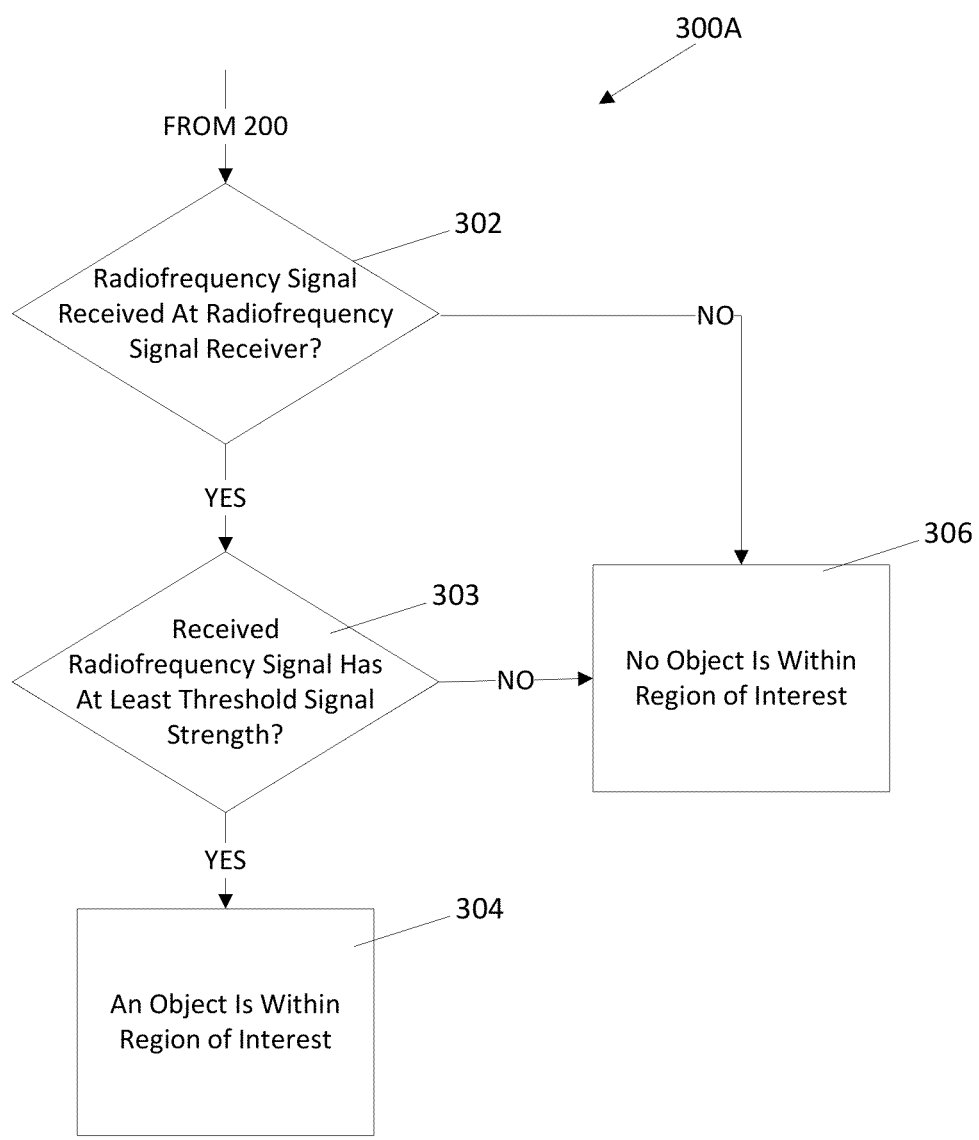
FIG. 5 is a flow diagram showing steps in an alternative embodiment of the determining step of FIG. 3.

FIG. 5 is a flow diagram showing steps in an alternative embodiment of the determining step of FIG. 3. At step 302, it is determined whether a radiofrequency signal has been received at the radiofrequency signal receiver. In the event that it is determined at step 302 that a radiofrequency signal has not been received, no object is considered to be within the region of interest (step 306). On the other hand, in the event that it is determined at step 302 that a radiofrequency signal has been received, then at step 303 it is further determined whether the received radiofrequency signal has a signal strength that is at least a threshold level. In the event that it is determined at step 303 that the received radiofrequency signal has a signal strength that at least a threshold level, an object is considered to be within the region of interest (step 304). Otherwise, no object is considered to be within the region of interest (step 306).

Although embodiments have been described with reference to the drawings, those of skill in the art will appreciate that variations and modifications may be made without departing from the spirit and scope thereof as defined by the appended claims.

For example, while embodiments described above include both a directionally transmitted exciter signal and a directionally transmitted response signal, each reflecting off of an object when in a region of interest, alternatives are possible. For example, in an alternative configuration, the exciter signal could be transmitted so as to excite the transponder 42 without reflecting off of an object when in the region of interest, if the reception of a signal by a radiofrequency signal receiver depended upon the radiofrequency response signal from the transponder reflecting off of the object when in the region of interest. That is, an exciter signal could be transmitted omni-directionally rather than directionally because the transponder 42 would be functioning directionally. In a similar manner, an alternative configuration could involve the radiofrequency transponder 42 transmitting its response signal omni-directionally for reception by a radiofrequency signal receiver, if excitation of the radiofrequency transponder 42 depended upon the exciter signal from the radiofrequency exciter reflecting off of the object when in the region of interest. That is, the radiofrequency response signal could be transmitted omni-directionally rather than directionally because the exciter would be functioning directionally.

In an alternative implementation, the radiofrequency exciter could be located separate from the radiofrequency signal receiver. In such an implementation, the exciter and receiver would not share the same antenna.

In an alternative implementation, mere reception of a radiofrequency response signal at the radiofrequency signal receiver, regardless of signal strength, is considered an indication that the object is within the region of interest.

What is claimed is:

1. A system for determining whether an object is within a region of interest, the system comprising:
   a radiofrequency signal receiver outside of the region of interest configured to receive radiofrequency signals from the direction of the region of interest; and
   a radiofrequency transponder positioned outside of the region of interest, the radiofrequency transponder comprising:
      a transponder radiofrequency signal transmitter; and
      a directional antenna configured to transmit radiofrequency signals away from the radiofrequency signal receiver and towards the region of interest,
   wherein radiofrequency signals transmitted by the radiofrequency transponder are only received at the radiofrequency signal receiver when the object is within the region of interest because of reflection of the radiofrequency signals off the object.

2. The system of claim 1, further comprising:
   a radiofrequency exciter outside of the region of interest configured to transmit exciter signals for exciting the radiofrequency transponder thereby to cause the radiofrequency transponder to transmit the radiofrequency signals.

3. The system of claim 2, wherein the radiofrequency exciter has a directional antenna configured to transmit the exciter signals away from the radiofrequency transponder and towards the region of interest,
   wherein presence of the object within the region of interest causes exciter signals transmitted by the radiofrequency exciter to reflect off of the object towards the radiofrequency transponder.

4. The system of claim 3, wherein the radiofrequency exciter and the radiofrequency signal receiver are combined as a single reader.

5. The system of claim 3, further comprising shielding associated with the radiofrequency transponder for impeding or blocking reception of exciter signals from directions other than the region of interest.

6. The system of claim 5, wherein the radiofrequency transponder is mounted on structure that is moveable relative to the radiofrequency signal receiver.

7. The system of claim 6, wherein the structure provides at least a portion of the shielding.

8. The system of claim 3, wherein each of the radiofrequency transponder, the radiofrequency signal receiver and the radiofrequency exciter is oriented with respect to the region of interest to maximize signal strength of exciter signals received by the radiofrequency transponder when an object is present in the region of interest, to maximize signal strength of radiofrequency signals received by the radiofrequency signal receiver when an object is present in the region of interest, to minimize signal strength of any exciter signals received by the radiofrequency transponder when an object is not present in the region of interest, and to minimize signal strength of any radiofrequency signals received by the radiofrequency signal receiver when an object is not present in the region of interest.

9. The system of claim 1, wherein the radiofrequency transponder is a passive radiofrequency identification (RFID) tag.

10. The system of claim 1, further comprising:
    a meter for measuring signal strength of radiofrequency signals received by the radiofrequency signal receiver from the radiofrequency transponder; and
    processing structure for determining whether the measured signal strength meets or exceeds a threshold level,
    wherein in the event that the measured signal strength meets or exceeds the threshold level, the processing structure indicates object presence in the region of interest.

11. The system of claim 10, wherein the processing structure indicates object presence by triggering creation and storage of a log entry.

12. The system of claim 10, wherein the processing structure indicates object presence by triggering creation of a predetermined electronic signal.

13. The system of claim 10, wherein signal strength of radiofrequency signals received at the radiofrequency signal receiver varies with the displacement of said object with respect to the region of interest.

14. The system of claim 1, further comprising shielding associated with the radiofrequency signal receiver for impeding or blocking reception of radiofrequency signals from directions other than the direction of the region of interest.

15. The system of claim 1, further comprising:
an adjustable mount associated with the radiofrequency transponder for mounting and facilitating adjustment of the position of the radiofrequency transponder with respect to the region of interest.

16. The system of claim 1, further comprising:
a reflector for directing exciter signals towards the radiofrequency transponder.

17. The system of claim 1, wherein the radiofrequency transponder transmits radiofrequency signals that are capable of generally reflecting off of a metal object at an angle of reflection that equals the angle of incidence.

18. The system of claim 17, wherein the radiofrequency transponder transmits signals at 800 MHz or greater.

19. The system of claim 18, wherein the radiofrequency transponder transmits Ultra High Frequency (UHF) signals.

20. A vehicle, comprising:
a driver's compartment;
an object lifting apparatus for lifting an object from in front of the vehicle; and
the system of claim 1, wherein the radiofrequency transponder is mounted to the object lift mechanism, the radiofrequency signal receiver is mounted within the driver's compartment, and the region of interest is defined with respect to the vehicle.

21. The vehicle of claim 20,
wherein the region of interest is defined with respect to a predetermined position of the object lifting apparatus, and further wherein the object lifting apparatus is capable of lifting an object from the ground to within the region of interest.

22. A method for determining whether an object is within a region of interest, the method comprising:
directionally transmitting one or more radiofrequency signal from a radiofrequency transponder located outside of the region of interest towards the region of interest and away from a radiofrequency signal receiver, the radiofrequency signal receiver located outside of the region of interest and configured to receive radiofrequency signals from the direction of the region of interest;
receiving at the radiofrequency signal receiver, the one or more radiofrequency signal only when the object is within the region of interest because of reflection of the one or more radiofrequency signal off the object; and
determining that the object is within the region of interest based on reception at the radiofrequency signal receiver of the directionally transmitted one or more radiofrequency signal.

23. The method of claim 22, wherein the determining comprises:
in the event that the directionally transmitted one or more radiofrequency signal is received at the radiofrequency receiver, determining that the object is within the region of interest; and otherwise
determining that the object is not within the region of interest.

24. The method of claim 22, wherein the determining comprises:
in the event the directionally transmitted one or more radiofrequency signal is received at the radiofrequency receiver and the received radiofrequency signal has at least a threshold level of signal strength, determining that the object is within the region of interest; and otherwise
determining that the object is not within the region of interest.

25. The method of claim 22, further comprising:
transmitting one or more exciter signal to a radiofrequency transponder thereby to cause the radiofrequency transponder to directionally transmit the one or more radiofrequency signal.

26. The method of claim 25, wherein transmitting the one or more exciter signal comprises directionally transmitting the one or more exciter signal away from the radiofrequency transponder and towards the region of interest,
wherein in the event that an object is within the region of interest the one or more exciter signal is caused to reflect off of the object towards the radiofrequency transponder.

27. The method of claim 26, further comprising:
impeding or blocking reception at the transponder of exciter signals from directions other than the region of interest.

28. The method of claim 26, further comprising:
providing a radiofrequency exciter for transmitting the one or more exciter signal.

29. The method of claim 28, further comprising:
orienting each of the radiofrequency transponder, the radiofrequency signal receiver and the radiofrequency exciter with respect to the region of interest to maximize signal strength of exciter signals received by the radiofrequency transponder when an object is present in the region of interest, to maximize signal strength of radiofrequency signals received by the radiofrequency signal receiver when an object is present in the region of interest, to minimize signal strength of any exciter signals received by the radiofrequency transponder when an object is not present in the region of interest, and to minimize signal strength of any radiofrequency signals received by the radiofrequency signal receiver when an object is not present in the region of interest.

30. The method of claim 22, further comprising:
measuring signal strength of one or more radiofrequency signal received by the radiofrequency signal receiver from the radiofrequency transponder; and
determining whether the measured signal strength meets or exceeds a threshold level, and
in the event that the measured signal strength meets or exceeds the threshold level, providing an indication of object presence in the region of interest.

31. The method of claim 30, wherein providing an indication of object presence comprises triggering creation and storage of a log entry.

32. The method of claim 30, wherein providing an indication of object presence comprises triggering creation of a predetermined electronic signal.

33. The method of claim 22, further comprising:
impeding or blocking reception at the radiofrequency signal receiver of radiofrequency signals from directions other than the direction of the region of interest.

34. The method of claim 22, further comprising:
providing a reflector for directing exciter signals towards the radiofrequency transponder.

35. The method of claim 22, wherein directionally transmitting one or more radiofrequency signal comprises directionally transmitting one or more radiofrequency signal that is/are capable of generally reflecting off of a metal object at an angle of reflection that equals the angle of incidence.

36. The method of claim 35, wherein directionally transmitting one or more radiofrequency signal comprises directionally transmitting one or more radiofrequency signal at 800 MHz or greater.

37. The method of claim 36, wherein directionally transmitting one or more radiofrequency signal comprises directionally transmitting one or more Ultra High Frequency (UHF) signal.

* * * * *